(12) United States Patent
Cohen et al.

(10) Patent No.: US 7,283,011 B2
(45) Date of Patent: Oct. 16, 2007

(54) METHOD FOR PERFORMING DUAL PHASE PULSE MODULATION

(75) Inventors: Daniel S. Cohen, Baltimore, MD (US); Daniel J. Meyer, Woodstock, MD (US); John L. Fagan, Pasadena, MD (US)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 10/836,705

(22) Filed: Apr. 29, 2004

(65) Prior Publication Data

US 2005/0077976 A1    Apr. 14, 2005

Related U.S. Application Data

(60) Provisional application No. 60/510,648, filed on Oct. 10, 2003.

(51) Int. Cl.
*H03K 7/04* (2006.01)

(52) U.S. Cl. .................. 332/112; 332/106; 332/109; 375/239; 370/215; 370/205

(58) Field of Classification Search ............ 375/239, 375/237, 253; 370/215, 205; 332/112, 106, 332/109, 237, 253; 341/53
See application file for complete search history.

(56) References Cited

U.S. PATENT DOCUMENTS

| | | | |
|---|---|---|---|
| 4,049,909 A | 9/1977 | Peck | 178/67 |
| 4,218,770 A | 8/1980 | Weller | 375/118 |
| RE30,482 E | 1/1981 | Whitlock | 360/32 |
| 4,408,166 A | 10/1983 | Moeller | 329/106 |
| 4,592,072 A | 5/1986 | Stewart | 375/55 |
| 4,641,323 A | 2/1987 | Tsang | 375/80 |
| 4,686,484 A | 8/1987 | Otani | 329/109 |
| 4,931,751 A | 6/1990 | Keller et al. | 332/108 |
| 4,931,790 A * | 6/1990 | Kobayashi et al. | 340/825.64 |
| 4,951,159 A | 8/1990 | Van Beek | 358/455 |
| 5,027,372 A | 6/1991 | Wong | 375/67 |
| 5,157,693 A | 10/1992 | Lemersal, Jr. et al. | 375/67 |
| 5,175,549 A | 12/1992 | Back | 341/152 |
| 5,202,643 A | 4/1993 | Sato | 329/309 |
| 5,379,323 A | 1/1995 | Nakaya | 375/85 |
| 5,394,410 A | 2/1995 | Chen | 371/70 |
| 5,408,499 A | 4/1995 | Sasaki | 375/286 |
| 5,428,321 A | 6/1995 | Yoshida et al. | 332/109 |
| 5,442,664 A | 8/1995 | Rust et al. | 375/371 |
| 5,506,873 A | 4/1996 | Suzuki | 375/324 |
| 5,614,861 A | 3/1997 | Harada | 329/308 |
| 5,625,645 A | 4/1997 | Greier et al. | 375/276 |
| 5,627,500 A | 5/1997 | Wolaver et al. | 332/112 |

(Continued)

*Primary Examiner*—Arnold Kinkead
(74) *Attorney, Agent, or Firm*—Schneck & Schneck; Thomas Schneck; Mark Protsik

(57) ABSTRACT

A modulation method, referred to as dual phase pulse modulation (DPPM), represents digital data as a series of high and low pulses whose widths represent groups of M data bits, with both the high and low pulses representing successive M-bit groups. Each of the $2^M$ possible data values for a group of M data bits uniquely corresponds to one of $2^M$ distinct pulse widths. This modulation method is essentially clockless, with data being decoded from a signal by detecting each pulse's width with respect to the last transition. Power consumption is reduced by having M data bits represented for each pulse transition, and by using both the high and low pulses to represent data.

10 Claims, 3 Drawing Sheets

U.S. PATENT DOCUMENTS

| | | | |
|---|---|---|---|
| 5,640,160 A * | 6/1997 | Miwa | 341/53 |
| 5,652,552 A | 7/1997 | Chung | 332/104 |
| 5,841,816 A | 11/1998 | Dent et al. | 375/331 |
| 5,963,074 A | 10/1999 | Arkin | 327/276 |
| 5,977,821 A | 11/1999 | Shibata | 329/306 |
| 6,025,758 A | 2/2000 | Lu | 332/100 |
| 6,094,450 A | 7/2000 | Shockey | 375/141 |
| 6,115,428 A | 9/2000 | Kim | 375/308 |
| 6,204,726 B1 | 3/2001 | Toshinori | 329/304 |
| 6,255,866 B1 | 7/2001 | Wolaver et al. | 327/107 |
| 6,297,691 B1 | 10/2001 | Anderson et al. | 329/300 |
| 6,429,693 B1 | 8/2002 | Staszewski et al. | 327/12 |
| 6,439,679 B1 | 8/2002 | Roylance | 347/9 |
| 6,711,122 B1 * | 3/2004 | Langley et al. | 370/205 |
| 6,947,493 B2 * | 9/2005 | Cohen et al. | 375/295 |
| 7,103,110 B2 * | 9/2006 | Cohen et al. | 375/295 |
| 2003/0035496 A1 | 2/2003 | Noda | 375/308 |
| 2003/0198478 A1 | 10/2003 | Vrazel et al. | 398/183 |
| 2005/0078019 A1 * | 4/2005 | Cohen et al. | 341/53 |
| 2005/0078021 A1 * | 4/2005 | Cohen et al. | 341/68 |
| 2006/0050777 A1 * | 3/2006 | Cohen | 375/238 |

* cited by examiner

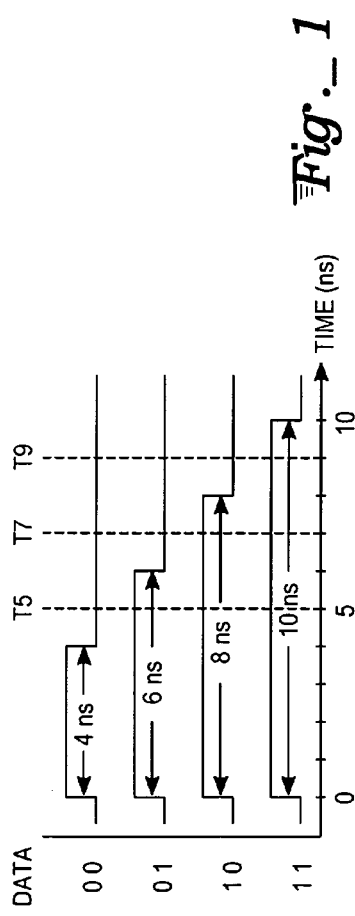
Fig._1
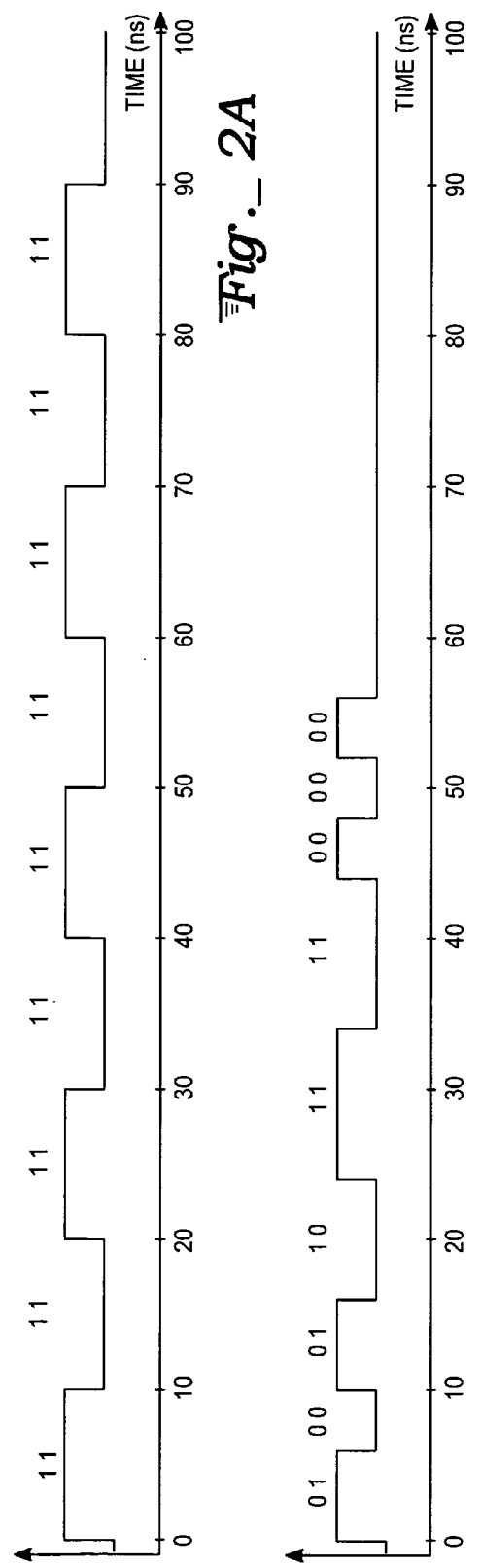
Fig._2A
Fig._2B

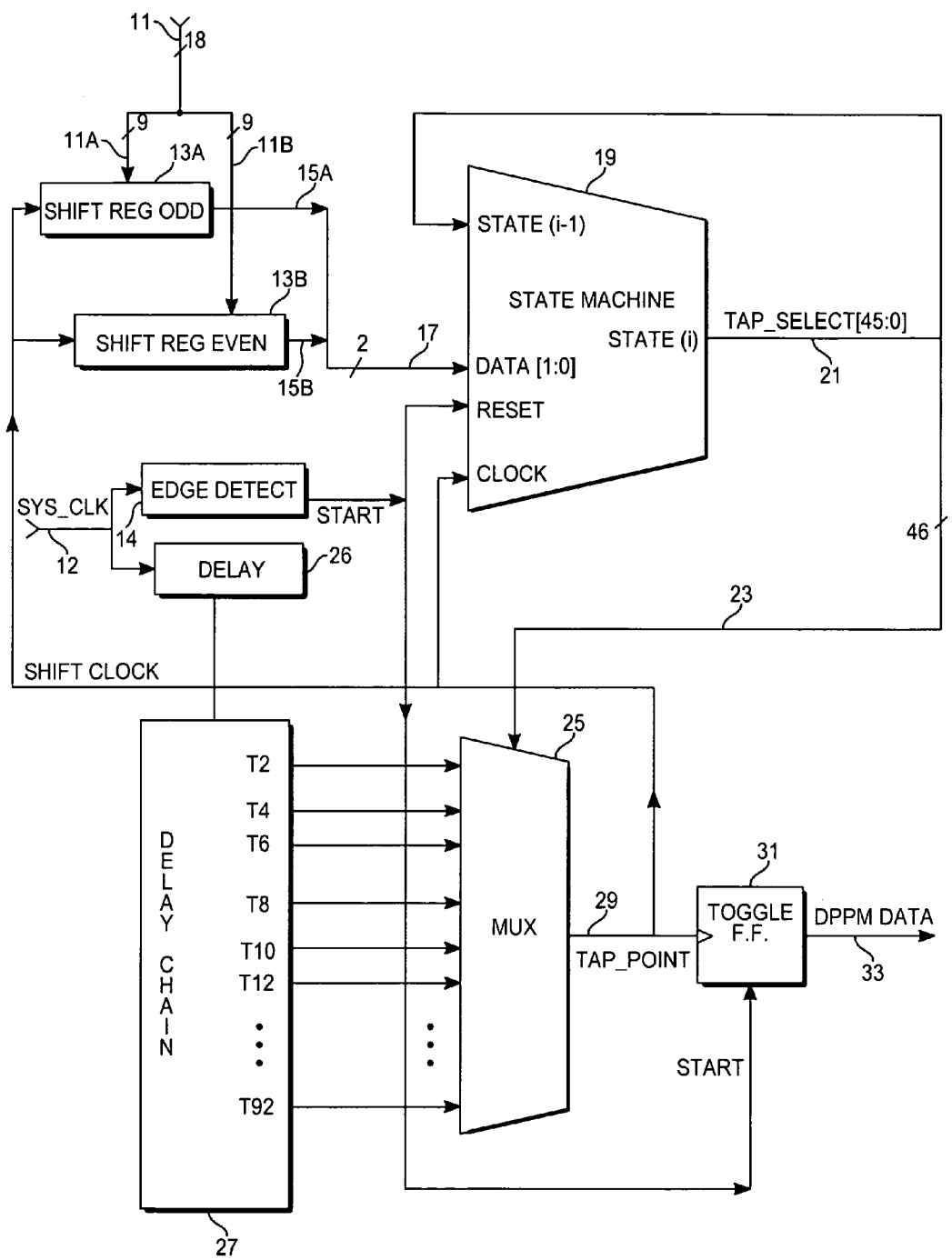
Fig._3

METHOD FOR PERFORMING DUAL PHASE PULSE MODULATION

CROSS-REFERENCE TO RELATED APPLICATION

This application claims the benefit under 35 U.S.C. 119(e) from U.S. provisional application No. 60/510,648, filed on Oct. 10, 2003.

TECHNICAL FIELD

The present invention relates to modulation of digital data for signal transmission and corresponding demodulation of received signals to recover digital data carried thereby, and relates especially to the particular type of modulation used to encode the data, such as pulse-duration (width) modulation (PDM or PWM), on/off keying, non-return-to-zero (NRZ) schemes, differential phase-shift keying (DPSK), multiple-frequency-shift keying (MFSK), and various forms of multi-bit/N-ary encoding.

BACKGROUND ART

The different types of communication signals are typically classified according to certain basic characteristics, such as whether the signal carrier is amplitude modulated, angle modulated, pulse modulated, or some combination of these modulation types. In a pulse-modulated signal, the pulses may likewise be modulated in amplitude, duration (width), position (phase), repetition rate (interval), or any combination thereof. There may be a single channel or multiple channels of either analog, quantized or digital information modulating the carrier, and there may be various forms of multiplexing the information. The information may represent audio sound, video pictures, measurements, alphanumeric characters and symbols, other kinds of data, or some combination of these.

Pulse-duration modulation (PDM), also known as pulse-width modulation, is modulation of a pulse carrier wherein the value of the information signal modulating the carrier produces a pulse of proportional duration by varying the leading, trailing, or both edges of the pulse. Usually in PDM, the pulse spacing or interval remains constant. Pulse-spacing (or interval) modulation is a form of frequency modulation in which the spacing or interval between pulses is modulated in accord with the information value. Usually, the pulse duration or width remains constant in this modulation type. Pulse-position modulation (PPM) is phase modulation of a pulse carrier wherein the information value varies the position in time of a pulse relative to its unmodulated time of occurrence. This differs from pulse-spacing modulation in that PPM usually requires a reference clock in order to accurately judge the relative phase or position of the pulses.

"Keying" is any form of digital modulation in which the signals are formed by modulating any characteristic of the carrier between discrete values. On/off keying is a binary form of amplitude-shift keying with two discrete states, one of which is the presence and the other the absence of energy in the keying interval. The information might be represented by the duration of one of the states (e.g., dots and dashes in Morse code telegraphy). However, usually the amplitude state itself or the transition from one state to the other represents the encoded information. There are a variety of possible coding schemes (e.g., unipolar, polar, dipolar, return-to-zero, return-to-one, non-return-to-zero). For example, non-return-to-zero (NRZ) is a modulation mode in which it is not necessary for the signal to return to zero after each data element is encoded in the signal, whereas return-to-zero and return-to-one are modulation modes in which the signal does return to zero (or one) after each data element is encoded.

Frequency-shift keying (FSK) is a form of frequency modulation in which the modulated output signal shifts between two or more discrete predetermined frequencies in accord with the information value. In multiple-frequency-shift keying (MFSK), groups of n data bits are encoded by $2^n$ discrete frequencies. Phase-shift keying (PSK) is a form of phase modulation in which the modulating information shifts the instantaneous phase of the modulated signal between predetermined discrete phase values. Differential phase-shift keying (DPSK) is a form of PSK in which the reference phase for a given keying interval is the phase of the signal during the preceding keying interval. FSK and PSK modulation typically involves a continuous-wave carrier rather than pulses.

Multi-bit or N-ary (ternary, quaternary, octary, etc.) encoding schemes have modulated signals in which each signal condition (amplitude, frequency, phase) represents more than one bit of information. MFSK is one example, but PSK or DPSK could likewise have more than two discrete phases, e.g., 4 phases representing dibits.

Each of the various forms of modulation has its own set of advantages and disadvantages relative to a specific application for which it will be used. Some factors to consider in choosing a particular form of modulation include bandwidth, power consumption requirements, and the potential for signal propagation errors and recovery of the original information. For digital data, whether a separate clock signal is required or the modulated signal is self-clocking may be important. The relative simplicity or complexity of the modulating and demodulating equipment or circuitry may also be a factor in the decision. Low power consumption is particularly sought for use with capacitive-loaded transmission lines.

DISCLOSURE OF THE INVENTION

The present invention, referred to hereafter as dual phase pulse modulation (DPPM), is a method of encoding data as a series of high and low pulses whose widths represent M-bit symbols. Each of the $2^M$ possible data values for a symbol (a group of M data bits communicated as a single unit) corresponds to one of $2^M$ distinct pulse widths. A series of N bits can be divided into approximately P=N/M symbols, where M is the symbol size in bits. The high signal pulses and the low signal pulses separately represent successive symbols. Thus, the P symbols can be sent in P/2 pulse cycles (a high pulse and a low pulse). If a return-to-zero scheme is desired, then the number of symbols P is preferably odd in order to simplify implementation. Encoding involves converting data into signal pulses, while decoding involves converting the series of signal pulses back into an ordered sequence of data bits.

DPPM is by its nature clockless. Data is decoded by detecting the width of the pulse with respect to the last transition. This means that no clock need be sent with the data, nor must a clock be encoded and recovered from the data. However, the beginning of the sequence of M symbols can be started so that it coincides with a clock, allowing easy clock recovery if desired.

DPPM reduces the amount of power consumed while transmitting data at high speed over a capacitive-loaded transmission line by decreasing the number of transitions.

Since most power is consumed charging the capacitive load on positive-going transitions (as well as some additional internal/crossbar energy on both positive and negative transitions), the use of both the high and low pulses to carry data saves power. Also, DPPM allows more data to be sent per transition than a classic pulse width modulation system by encoding multiple bits per high or low pulse.

DPPM also benefits from not requiring a synchronous clock or "lengthy" period of clock recovery. Other phase modulation schemes require a synchronous clock to be sent or recovered from the data. In implementations where short bursts of data are sent intermittently, significant power savings can be achieved, since no clock needs to be transmitted or recovered.

DETAILED DESCRIPTION OF THE DRAWINGS

FIG. 1 is a graphic illustration (signal value versus time) of a set of DPPM pulses of various pulse durations for representing a corresponding set of dibit data symbols in accord with the present invention.

FIGS. 2a and 2b are graphical illustrations of DPPM pulse trains in accord with the present invention for a set of exemplary data, showing transmission of a series of 9 high and low going pulses within a single 100 ns system clock period.

FIGS. 3 and 4 are schematic circuit diagrams of respective DPPM encoder and decoder circuitry for implementing the DPPM method of the present invention.

BEST MODE FOR CARRYING OUT THE INVENTION

Figure 4:
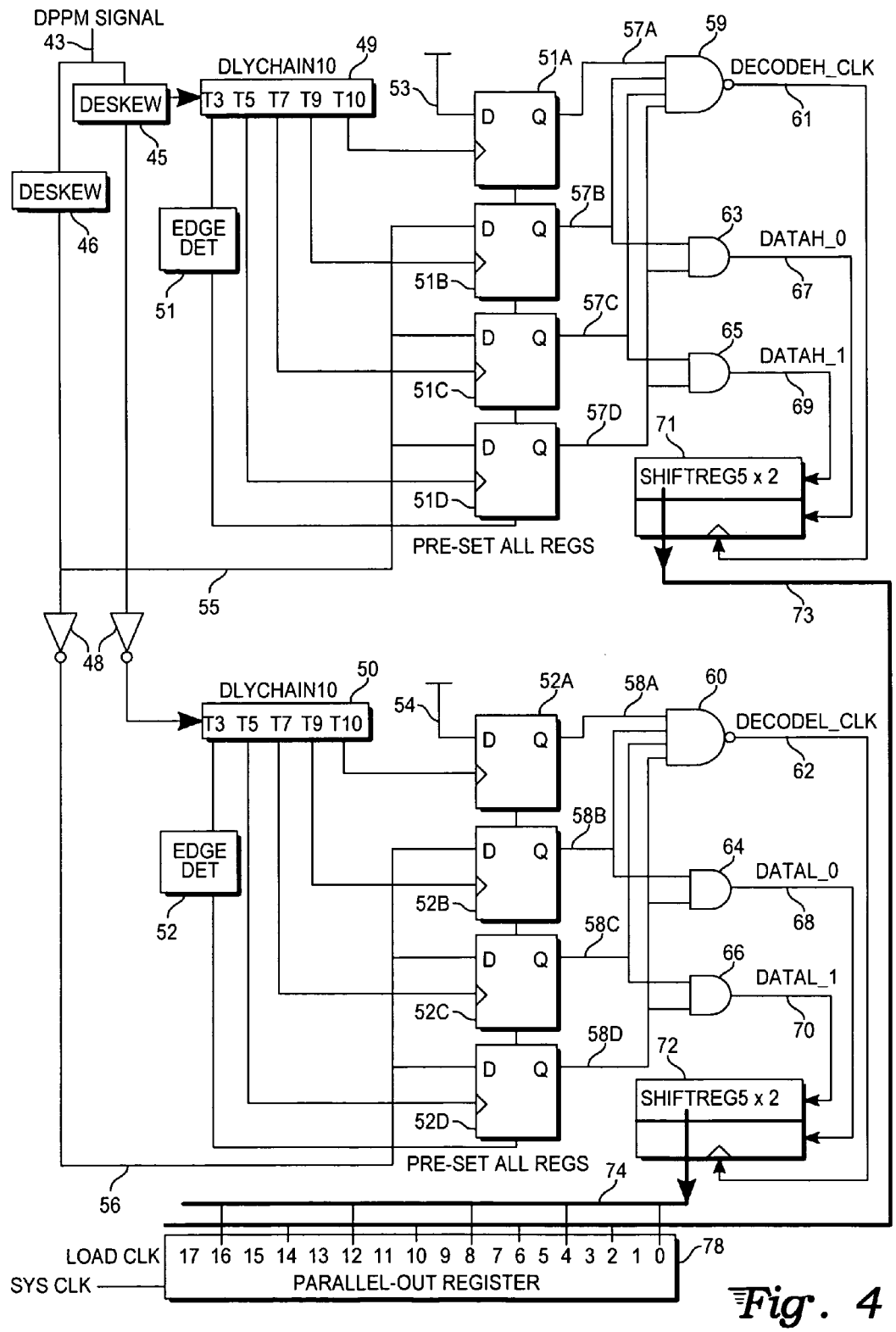

DPPM is a method of encoding data, resident in digital circuitry in the form of binary circuit states (ones and zeros), as a string of alternating high and low signal pulses whose respective durations or widths represent 2 (or more) bits of data per pulse. An exemplary embodiment shown in FIG. 1 uses 2 bits for encoding. The pairs of bits are encoded using a set of distinct pulse widths representing each possible dibit symbol value, such as:

00=4 ns pulse
01=6 ns pulse
10=8 ns pulse
11=10 ns pulse

The choice of 4, 6, 8, and 10 ns pulse widths is arbitrary and could just as well have been 4, 5, 6, and 7 ns or some other pulse widths, provided the decoding circuitry at the receiving end of a DPPM signal transmission can correctly distinguish the different pulse widths from each other. The decoding circuitry (as well as process variation, noise and signal degradation, and temperature/voltage variation in the propagating environment) also establishes a practical limit to the number of bits that can be encoded per pulse, with 3 bits per pulse having 8 (=$2^3$) possible pulse widths needing to be correctly resolved and 4 bits per pulse having 16 (=$2^4$) possible pulse widths needing to be correctly resolved. The data rate can be considered to be the number of encoded bits per second (or alternatively, the number of symbols per second), which depends on the number of pulses per system clock cycle and on the system clock frequency.

"Dual Phase" refers to the fact that the information is sent as both the high-going pulses and the low-going pulses. Most pulse width modulation schemes simply vary the width of the high going pulse and therefore are really modulating the duty cycle. DPPM independently modulates the width of both high and low going pulses, with different groups of bits encoded in the high and low portions of each "cycle."

Therefore, clock period and duty cycle are not valid concepts with respect to the generated pulse train. DPPM is by its nature "clockless," meaning the data can be decoded by simply detecting the width of the pulse with respect to each transition. This means that no clock need be sent with the data, nor must a clock be encoded and recovered from the data. This is a major advantage when transmitting time critical bursts between different chips, since it removes the necessity of manipulating a clock which would introduce opportunity for timing variance and error. The only clock consideration is the fact that several pulse "cycles" will be sent within each system clock period. For example, FIGS. 2a and 2b show examples of DPPM pulse trains of alternating high and low pulses (5 high pulses and 4 low pulses) transmitting 18 bits of data (organized here as 9 dibits) in a 100 ns system clock period. These 18 bits can form, for example, a 16-bit data word with two error correction code bits appended to the word. Thus one data word may be transmitted per system clock period.

Since information is sent on both positive and negative phases of the pulse train, DPPM is by its nature a non-return-to-zero (or non-return-to-one) modulation scheme. However, it is typically desired that the sequence of pulses contained within a system clock period return to zero (or one) at the end of each such sequence. This preference is most easily implemented when, as in the FIGS. 2a and 2b examples, the number of multi-bit symbols in a word to be represented as pulses is odd, since the final symbol in the sequence requires a return to zero (or return to one) as the trailing transition of the last pulse. However, this rule needn't be followed if an extra pulse is inserted by the encoder and ignored by the decoder to force a return.

Thus, the DPPM method represents groups of M data bits, such as dibits (M=2), as signal pulses of specified widths. Each of the $2^M$ possible data values corresponds to one of $2^M$ distinct pulse widths, and successive groups of M data bits are represented by signal pulses that are alternately high and low. Signal encoding and decoding circuitry performs the conversion between the data bit and signal pulse representations of the information content.

For encoding data bits as signal pulses, received data words are first subdivided into an ordered sequence of groups of M data bits, then each group in the sequence is converted into its corresponding signal pulse representation, thus producing a series of high and low signal pulses that represent the data. One way to perform the conversion of data words into signal pulses is to specify signal pulse transition times, each corresponding to a preceding transition time that is incremented by a specified pulse width corresponding to a present group of M data bits, and then producing signal pulse transitions at those specified transition times. The exemplary encoder hardware that is described below with reference to FIG. 3 performs the conversion in this way.

For decoding a DPPM signal back into data, the pulse width for each of the high and low signal pulses is determined, then converted back into an ordered sequence of groups of M data bits, and recombined into data words. One way to perform this conversion is carried out by the exemplary decoder hardware set forth in the following description with reference to FIG. 4.

Exemplary Encoder and Decoder Hardware that Could be Used to Implement the DPPM Method Follows:

With reference to FIG. 3, an exemplary DPPM encoder circuit receives data words (e.g., 18 bits grouped into 9 dibits) on a parallel data input bus 11, here divided into two parts 11A and 11B. A load signal (not shown) indicates when data is available. If no data is available, the DPPM encoder is held idle. Sys_Clock 12 is a system clock that is also created externally to the DPPM encoder.

The circuit takes the received data on the odd and even data buses 11A and 11B and, synchronously to the system clock, loads it into two parallel-in, serial-out shift registers 13A and 13B. The odd bits (i.e., bits 1, 3, 5, 7, 9, 11, 13, 15, and 17) are loaded from bus lines 11A into the other shift register 13A (Shift Reg Odd). The even bits (i.e., bits 0, 2, 4, 6, 8, 10, 12, 14, and 16) are loaded from bus lines 11B into one shift register 13B (Shift Reg Even).

The contents of the registers are then serially shifted out in pairs 15A and 15B. A Shift Clock pulse fed from the multiplexer output 29 ensures that successive shifts of data out of the registers 13A and 13B are synchronized to the end of each DPPM signal pulse. In this way, the data words are subdivided into an ordered sequence of groups of M data bits each (here, M=2). If the data were to be divided instead into groups of three or four bits each, then the input bus 11 would typically be divided into three or four parts loading into three or four shift registers, each shift register providing one of the bits of each group on its serial output.

The register outputs 15A and 15B are connected to an input 17 to a state machine 19, whose N-bit output 21 is a function of its current value and the 2-bit pair to be encoded. In particular, the state machine 19 iteratively increments its state by an amount corresponding to the pulse widths for the successive 2-bit pairs received at state machine input 17. The N-bit output 21 has only one active bit and is used as an input 23 to control an multiplexer 25 for selecting the successive taps from the current-controlled delay chain 27. The multiplexer output 29 is used to clock a toggle flip-flop 31 and thus encode the data on its output 33 as a series of high and low pulses whose width represents the value of the 2-bit pair.

An edge detector circuit 14, which may be any known edge detector, issues a start pulse of 2 to 3 ns duration at each rising edge of the system clock, Sys_Clock. The start pulse resets the state machine 19 to a first tap selection state (tap_select[44:1]=0 and tap_select[0]=1). The start pulse also sets the toggle flip-flop 31 to its 'set' state (output high). A 1 ns pulse synchronous to the system clock is presented on input 12 to the start of a 92-element delay chain 27. A first delay element 26, shown separately, takes into account the time involved in loading the shift registers 13A and 13B and presenting the first pair of data bits to the state machine 19.

Each element in the delay chain 27 is here calibrated to have a 1 ns delay. Therefore, the pulse takes 92 ns to travel down the delay chain. Assuming that a first DPPM signal transition occurs at a time delay of 2 ns (corresponding to tap_select[0]), the delay chain's size corresponds to the maximum total time needed to represent a complete 18-bit word as a series of DPPM signal pulses, when using the set of pulse widths described above for FIG. 1. That is, a time duration of 90 ns is required to transmit nine "11" bit pairs as nine high and low signal pulses of 10 ns pulse width. If other word sizes and pulse width sets are chosen, the number of delay elements, and possibly even the amount of time delay per element, will change accordingly. The period of the system clock must exceed the total duration of a sequence of signal pulses when all are of the maximum pulse width. If a delay-locked loop (DLL) is used to calibrate the delay chain to the system clock, then pulse widths will be automatically scaled for different system clocks.

The least significant bits in the two shift registers 13A and 13B represent the current bit pair to be encoded and are input from lines 17 into a tap selector state machine 19. This state machine 19 selects a tap point for the 92-element delay chain 27. The pulse widths may be 4, 6, 8, or 10 ns for the four possible bit pairs, in which case the valid tap points are only on the even delay elements, so that there are 46 valid tap points in this implementation. (However, the choice of pulse widths is arbitrary and another set of pulse widths could be chosen. The choice of pulse widths is based on the need to provide enough separation such that the decoder can accurately distinguish between them. "Enough" is determined by factors such as desired noise/error margin, amount of noise in the system, and characteristics of the technology used to implement the system, including process variation, switching speed, and setup/hold requirements.)

The tap point selection 21 is incremented based on the present tap point (STATE(i)) and the next 2-bit data (DATA [1:0]) to be encoded. The tap selects are preferably implemented as a one-shot state machine 19—essentially a shift register capable of multiple shifts per cycle—where a single active state is incremented by 2, 3, 4, or 5 positions on each clock, depending upon the 2-bit data value input from data lines 17. While requiring a register for every state is area-inefficient, this implementation allows for extremely fast switching of states and therefore quick control of the multiplexer 25. There is a one-to-one correspondence between the tap selection 21 that is output from the state machine 19 and the delay chain tap, T2 through T92, that is selected by the multiplexer 25. The timing is such that the tap point must increment to the next value before the rising edge propagating down the delay chain reaches the next tap point.

The tap point selection 21 is the selector control 23 for the multiplexer 25. The output 29 of the multiplexer 25 is a 1 ns pulse that occurs once at each selected tap point. This multiplexer output 29 clocks a toggle flip-flop 31 and also forms the Shift Clock pulse that shifts the data in the shift registers 13A and 13B and clocks the state machine 19 from one state to the next. The output 33 of the toggle flip-flop 31 is the DPPM output of the entire encoder circuit of FIG. 3.

With reference to FIG. 4, an exemplary DPPM decoder circuit processes serial DPPM signals received on an input 43 to obtain a parallel data output from an output register 78. Sys_Clock is a system clock that is created externally to the DPPM decoder. Deskew blocks 45 and 46 allow independent fine-tuning of delay on the DPPM signal that is used for clocking the D-flip-flops 51A-51D and 52A-52D and providing the data that is sampled by those same flip-flops. The amount of deskew may be controlled, for example, by a register (not shown) that tunes a venier circuit in each of the blocks 45 and 46. The high and low pulses are decoded separately. Inverters 48, coupled to the DPPM signal input 43 through the deskew blocks 45 and 46, invert the DPPM signal pulses so that substantially identical subcircuits can be used for decoding both the high and low pulses, as explained further below.

In general, the value of the data is determined by detecting the pulse widths with respect to the leading edge of each pulse. The modulated signal representing the data is piped through a short delay chain and outputs are used to clock and sample the non-delayed signal. As a result, the decoding requires no independent or recovered clock. More specifically, the serial-to-parallel DPPM data decoder includes two delay chains 49 and 50, each having K−1 outputs representing different stages of the delay chain, where K is the number of different delay values representing encoded data. For 2-bit encoding, K=4 (for 3-bit encoding, K=8, etc).

Returning to FIG. 1, for an implementation using 2-bit encoding, the data may be represented, for example, as 4, 6, 8, and 10 ns pulse widths. By sampling a pulse at times T5, T7, and T9 between the various possible trailing edge times for the different encoded pulse width values, the length of the pulse can be determined and then decoded back into its constituent pair of data bits. Thus, at a time T5 (i.e., 5 ns after the pulse leading edge), a 4 ns pulse encoding the dibit data value 00 will already have ended, whereas pulses encoding other dibit data values will not yet have transitioned at their trailing edge to the opposite signal state. Likewise, at time T7, a 6 ns pulse encoding data value 01 will also have ended, and later at time T9, an 8 ns pulse encoding data value 10 will have ended, but a 10 ns pulse encoding data value 11 will still continue for another nanosecond.

As seen in FIG. 4, the rising edge of a data pulse is sent through a first delay chain 49 and appears at T5, T7, and T9, which are used to clock a set of flip-flops 51B-51D and thus sample the data pulse presented on line 55. For low-going pulses, the incoming DPPM signal is first inverted, then sent through a second delay chain 50 that is used with another set of flip-flops 52B-52D to sample the inverted data pulse presented on line 56. High and low pulses are therefore independently decoded. Also, by using two delay chains with the low pulses inverted before sampling, it is possible to decode the DPPM signal using only rising edges traveling through the delay chains. This produces the added benefit of avoiding dispersion of rise/fall data pulses within the delay chain.

The logic AND gates 63-66 convert the sampled pulse values that are output from the flip-flops 51B-51D and 52B-52D on lines 57B-57D and 58B-58D into their corresponding data values.

It can be seen that the DPPM method allows for pulse widths to be decoded with respect to the leading edges of pulses, and therefore does not require a clock. This means that no extra clock lines, clock encoding, or clock recovery circuits are required on the receiver. In fact, because delayed versions of the data pulses are actually used to clock (or sample) the incoming non-delayed data pulses, this decoding technique produces an added benefit of eliminating the possibility of introducing error when manipulating or recovering a clock.

What is claimed is:

1. A dual phase pulse modulation method, comprising representing groups of M data bits, resident in digital circuitry in the form of circuit states, as transmitted high signal pulses and low signal pulses of specified widths, each of a possible $2^M$ data values of the M data bits corresponding to one of $2^M$ distinct pulse widths, successive groups of M data bits being represented by successive high signal pulses and low signal pulses, the high signal pulses and the low signal pulses separately representing distinct groups of data bits.

2. The dual phase pulse modulation method as in claim 1, further comprising converting between data bit and signal pulse representations by use of a signal encoder or decoder circuit.

3. A dual phase pulse modulation method, comprising:
   (a) representing groups of M data bits, resident in digital circuitry in the form of circuit states, as transmitted high signal pulses and low signal pulses of specified widths, each of a possible $2^M$ data values of the M data bits corresponding to one of $2^M$ distinct pulse widths, successive groups of M data bits being represented by successive high signal pulses and low signal pulses, the high signal pulses and the low signal pulses separately representing distinct groups of data bits; and
   (b) encoding data into a dual phase pulse modulation signal by converting groups of data bits into a string of corresponding signal pulses representing said groups of data bits by use of a signal encoder circuit.

4. The dual phase pulse modulation method as in claim 3, wherein the encoding comprises:
   (a) receiving data words into the signal encoder circuit;
   (b) subdividing the received data words into an ordered sequence of groups of N data bits;
   (c) converting each of the groups of M data bits into a series of high signal pulses and low signal pulses having specified widths, each width corresponding to one of the groups of M data bits; and
   (d) outputting the series of signal pulses from the signal encoder circuit.

5. The dual phase pulse modulation method as an claim 4, therein the converting step comprises specifying successive low-to-high and high-to-low signal pulse transition times corresponding to a preceding transition time incremented by a specified pulse width corresponding to a present group of M data bits, then producing a signal pulse transition at said specified signal pulse transition time, and repeating the transition time incrementing and transition producing for each successive group of M data bits.

6. The dual phase pulse modulation method as in claim 3, wherein the groups of M data bits are dibits (M=2) represented by signal pulses of 4 distinct pulse widths.

7. A dual phase pulse modulation method, comprising:
   (a) representing groups of M data bits, resident in digital circuitry in the form of circuit states, as transmitted high signal pulses and low signal pulses of specified widths, each of a possible $2^M$ data values of the M data bits corresponding to one of $2^M$ distinct pulse widths, successive groups of M data bits being represented by successive high signal pulses and low signal pulses, the high signal pulses and the low signal pulses separately representing distinct groups of data bits; and
   (b) decoding a dual phase pulse modulation signal into digital data by converting a string of signal pulses into their corresponding groups of data bits by use of a signal decoder circuit.

8. The dual phase pulse modulation method as in claim 7, wherein the decoding comprises:
   (a) receiving a string of successive high signal pulses and low signal pulses into the signal decoder circuit;
   (b) determining a pulse width for each of the signal pulses;
   (c) converting the series of high signal pulses and low signal pulses into an ordered sequence of groups of M data bits whose data values correspond to specified pulse widths of the respective signal pulses; and
   (d) combining successive groups of M data bits into data words.

9. The dual phase pulse modulation method as in claim 8, wherein the decoding further comprises:
   (a) subsequent to receiving a string, directing the string into non-inverted and inverted paths, such that high signal pulses are decoded from the non-inverted path and low signal pulses are decoded from the inverted path, and
   (b) wherein the converting of the series of signal pulses involves independently converting the high signal pulses from the non-inverted path and the low signal pulses from the inverted path into two sets of ordered sequences of groups of data bits respectively representing the decoded high pulses and decoded low pulses.

10. The dual phase pulse modulation method as in claim 7, wherein the groups of N data bits are dibits (A=2) represented by signal pulses of 4 distinct pulse widths.

* * * * *